United States Patent [19]

O'Brien, Jr. et al.

[11] Patent Number: 4,673,012
[45] Date of Patent: Jun. 16, 1987

[54] TOOL TENSIONING DEVICE FOR DEBARKING MACHINE

[76] Inventors: John A. O'Brien, Jr., 2133 Vestridge Dr., Birmingham, Ala. 35216; James H. Hutson, Rte. 4, Box 925, Pell City, Ala. 35125

[21] Appl. No.: 805,885

[22] Filed: Dec. 6, 1985

[51] Int. Cl.⁴ .............................................. B27L 1/00
[52] U.S. Cl. .................... 144/208 E; 144/341
[58] Field of Search ............... 144/208 R, 208 E, 341

[56] References Cited

U.S. PATENT DOCUMENTS

| | | | |
|---|---|---|---|
| 2,785,715 | 3/1957 | Brundell et al. | 144/208 E |
| 2,857,945 | 10/1958 | Brundell et al. | 144/208 E |
| 2,903,028 | 9/1959 | Brundell et al. | 144/208 E |
| 3,053,294 | 9/1962 | Andersson | 144/208 E |
| 3,587,684 | 6/1971 | Bush, Jr. | 144/208 E |
| 4,122,877 | 10/1978 | Smith et al. | 144/208 E |

Primary Examiner—W. D. Bray
Attorney, Agent, or Firm—Michael, Best & Friedrich

[57] ABSTRACT

A debarking machine having a plurality of debarking tools spaced circumferentially around a rotor. The debarking tools are movable independently between radially inward positions and dilated positions. Movement of the debarking tools is caused by hydraulic rotary actuators, hydraulic fluid pressure being supplied to the actuators independent hydraulic accumulators, a pair of hydraulic accumulators being provided for each rotary actuator.

21 Claims, 4 Drawing Figures

U.S. Patent	Jun. 16, 1987	4,673,012
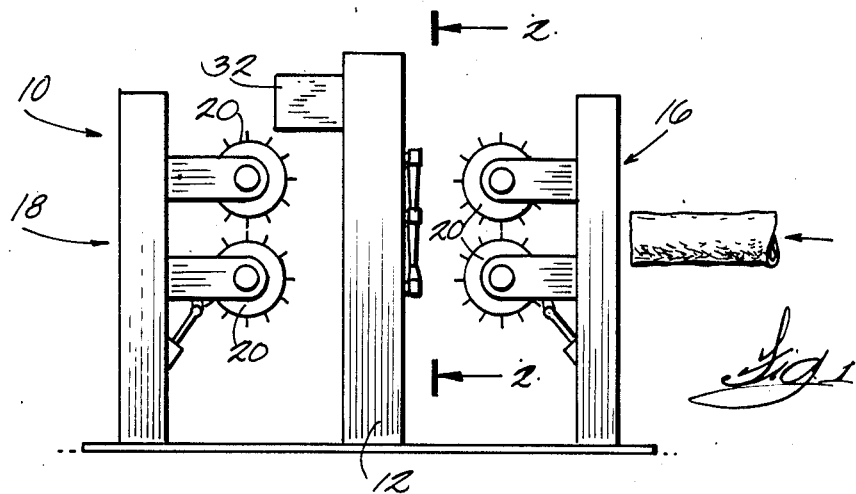
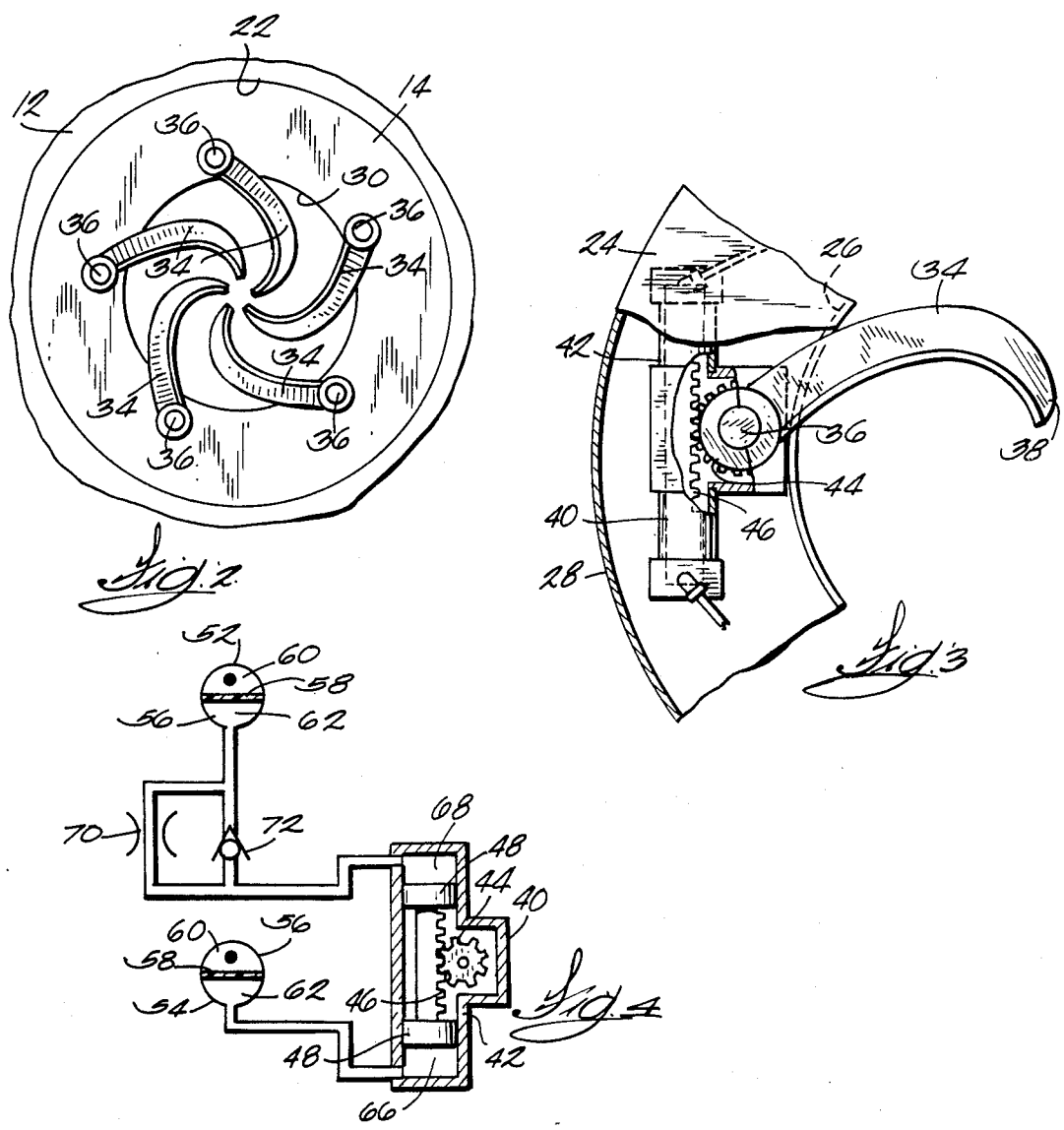

TOOL TENSIONING DEVICE FOR DEBARKING MACHINE

FIELD OF THE INVENTION

The invention relates to ring-type debarkers and to means for causing debarking tools of a ring debarker to forceably engage a log as the log moves through the debarker.

BACKGROUND PRIOR ART

Prior art ring debarkers utilize a multiplicity of debarking tools equally spaced around a hollow rotating rotor and adapted to forceably engage a log as the log moves through a central opening in the rotor. A tensioning means is provided to force the debarking tools into engagement with the log such that they will remove the bark from the log as the log moves through the rotating rotor. Entry of a log into the central opening of the rotor or hollow head causes the end of the log to contact the debarking tools. This contact of the log with the debarking tools forces the tools to an open or dilated position whereupon the ends of the tools will engage the outside of the log.

Prior art apparatus for pretensioning the debarking tools includes the use of a plurality of resilient neoprene bands. The bands are connected to the pivotal debarking tools and pretensioned so as to force the debarking tools inwardly toward the center of the opening of the rotor.

In one of the prior art arrangements the bands are pretensioned by a hydraulic system. Oil is introduced into hydraulic cylinders by way of a common manifold such that the hydraulic fluid pressure in each of the cylinders is equal. Accordingly, the tension generated in each of the bands is equal.

In another prior art arrangement a mechanical device is provided for pretensioning the neoprene bands. With this arrangement the force applied by the tools against the logs is dependent upon the character or characteristics of the individual bands.

A common problem with the prior art pretensioning mechanisms is the quantitative value of the tool tension applied by the tool against the surface of the log increases as the diameter of the log being debarked increases. This results in increased difficulty in opening the tools if large logs are fed into the debarking machine. Additionally, this increase in tool force applied by the tools against large logs is not required since the tools adequately debark smaller logs wherein a lesser force is applied by the debarking tools against the logs. The high tool force or tool tension generated by the tools against the larger logs frequently results in tool breakage, feed roll shaft breakage and bearing failure. Additionally, there can be a loss of fiber on larger diameter logs.

An additional problem occasioned by the construction of the prior art arrangements is presented with those machines having a hydraulic system for pretensioning the debarking tools. In such machines, in the event a knot passes under a tool, the tool must open further to ride over the protrusion. This opening action causes an increase in the hydraulic pressure in the pretensioning cylinder. Since all of the pretension cylinders are connected by a common manifold, the pressure in all the cylinders is increased. The effect of this is to contribute to the failure such as tool breakage, feed roll shaft breakage and bearing failure.

A further problem with these systems presents itself when a log with a significant sweep is placed in the machine. When the tools open to accommodate the periphery of a log having a curve or bend, the increased pressure in the pretension cylinders tends to move the tool center off the center line of the machine. This can also result in the failures referred to above and can also cause jamming of the machine and incomplete removal of bark from a log.

Another problem with the prior art debarking machines is that when the tools disengage the trailing end of the log, the tension force on the tools tends to cause the tools to close rapidly. The tools are caused to slam closed against a weldment which is equipped with a resilient neoprene facing or pad. Over a period of time this impact closing action can be detrimental to the tool mechanism particularly when the pad or facing breaks up or becomes separated from the weldment.

Attention is also directed to the Brundell et al. Pat. No. 2,785,715, issued Mar. 19, 1957; the Brundell et al. U.S. Pat. No. 2,857,945, issued Oct. 28, 1958; the Brundell et al. Pat. No. 2,903,028, issued Sept. 8, 1958; and the U.S. Brundell et al. U.S. Pat. No. 2,860,672, issued Nov. 18, 1958.

Attention is further directed to the Anderson U.S. Pat. No. 3,053,294, issued Sept. 11, 1962; the U.S. Bowers U.S. Pat. No. 3,709,272, issued Jan. 9, 1973; the U.S. Jonsson Pat. No. 3,973,607, issued Aug. 10, 1976; the U.S. Bush U.S. Pat. No. 3,587,684, issued June 28, 1971; and the Smith, et al. U.S. Pat. No. 4,122,877, issued Oct. 31, 1978.

SUMMARY OF THE INVENTION

The invention includes an apparatus for removing bark from a log, the apparatus including a frame, a rotor having a central opening and supported by the frame for rotation about its longitudinal axis, and means for feeding logs through the central opening of the rotor in the direction of the longitudinal axis. A plurality of debarking tools are supported by the rotor for rotation about the longitudinal axis, the debarking tools being spaced apart circumferentially around the rotor. A first one of the debarking tools is supported for pivotal movement with respect to the rotor about a first pivot axis and between an open position and a closed position. Means are also provided for biasing the first debarking tool toward the closed position, the means for biasing including a first hydraulic fluid motor, a first source of hydraulic fluid pressure operably connected to the first hydraulic fluid motor, and a second source of hydraulic fluid pressure operably connected to the first hydraulic fluid motor. A second one of the debarking tools is supported for pivotal movement with respect to the rotor about a second axis spaced from the pivot axis of the first debarking tool, the second debarking tool being supported for pivotal movement between an open position and a closed position. Means are also provided for biasing the second one of the debarking tools toward the closed position including a second hydraulic fluid motor operably connected to the second debarking tool, a third source of hydraulic fluid pressure operably connected to the second hydraulic fluid motor, and a fourth source of hydraulic fluid pressure operably connected to the second hydraulic fluid motor.

In one embodiment of the invention the first hydraulic fluid motor is a rotary actuator including a first hydraulic fluid port and a second hydraulic fluid port, and the first source of hydraulic fluid pressure is a first hydraulic accumulator operably connected to the first hydraulic fluid port to supply hydraulic fluid pressure to the first hydraulic fluid port, the second source of hydraulic fluid pressure is a second hydraulic accumulator operably connected to the second hydraulic fluid port to supply hydraulic fluid pressure to the second hydraulic fluid port.

In one embodiment of the invention the second hydraulic fluid motor is a second rotary actuator including a third hydraulic fluid port and a fourth hydraulic fluid port, the third source of hydraulic fluid pressure is a third hydraulic accumulator operably connected to the third hydraulic fluid port to supply hydraulic fluid pressure to the third hydraulic fluid port, and the fourth source of hydraulic fluid pressure is a fourth hydraulic accumulator operably connected to the fourth hydraulic fluid port to supply hydraulic fluid pressure to the fourth hydraulic fluid port.

In one embodiment of the invention the first hydraulic fluid motor includes a first rotary actuator connected to the first debarking tool for causing pivotal movement of the first debarking tool, the first rotary actuator including a high pressure fluid port and a low pressure fluid port. The first source of hydraulic fluid pressure is connected to the high pressure port and a second source of hydraulic fluid pressure is connected to the low pressure fluid port.

In one embodiment of the invention the first source of hydraulic fluid pressure includes a first hydraulic pressure accumulator containing hydraulic fluid having a first hydraulic fluid pressure and the second source of hydraulic fluid pressure includes a second hydraulic pressure accumulator containing hydraulic fluid having a second hydraulic fluid pressure, the first hydraulic fluid pressure being greater than the second hydraulic fluid pressure.

In one embodiment of the invention means are provided for restricting the flow of hydraulic fluid from the first rotary actuator to the second hydraulic pressure accumulator, the means for restricting flow providing unrestricted flow of hydraulic fluid from the second hydraulic pressure accumulator to the first rotary actuator.

In one embodiment of the invention means are provided for controlling the speed of movement of the first debarking tool from the open position to the closed position, the means for controlling the speed of movement including means for controlling the flow of hydraulic fluid from the first hydraulic fluid motor to the second source of hydraulic fluid pressure.

Various other features and advantages of the invention will be apparent by reference to the following description of a preferred embodiment, from the drawings and from the claims.

BRIEF DESCRIPTION OF THE DRAWINGS

FIG. 1 is side elevation view of a log debarking machine embodying the present invention.

FIG. 2 is an enlarged view taken along line 2—2 in FIG. 1.

FIG. 3 is an enlarged partial view of apparatus illustrated in FIG. 2 with portions cut away.

FIG. 4 is a schematic view of a hydraulic circuit controlling operation of the hydraulic rotary actuator illustrated in FIG. 3.

Before describing at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a log debarking machine 10 having a frame 12 which supports an angular tool holder or rotor 14 (FIG. 2). An entry feed roll assembly 16 is mounted in front of the tool holder 14, and an exit feed roll assembly 18 is mounted in back of the tool holder 14. The feed roll assemblies 16 and 18 are conventional and will not be described in detail. Generally, each feed roll assembly 16 and 18 includes a plurality of rollers 20 intended to grip a log therebetween. Means (not shown) are also provided for rotatably driving the rollers 20 such that as the rollers grip a log, rotation of the rollers will drive the log through the rotor 14. A log having bark thereon is fed by the feed roll assembly 16 in the machine from the right side as seen in FIG. 1 along a prescribed path, travels through the machine without appreciably turning about its longitudinal axis as the bark is removed therefrom, and subsequently travels out of the machine on the left side as seen in FIG. 1.

The frame 12 includes a central opening 22 adapted to rotatably house the rotor 14 and supports the rotor 14 in a conventional manner for rotation about a central horizontal longitudinal axis. The rotor 14 comprises an annular ring, and in the specific construction illustrated, includes forward and rearward facing plates 24, and inner and outer concentric cylinders 26 and 28, respectively. The rotor 14 also includes a central circular opening 30 for permitting logs to move through the rotor 14 in the direction of the longitudinal axis of the rotor. Means are also provided for rotatably driving the rotor 14 such that it rotates around the central longitudinal axis. The means for driving the rotor 14 is conventional and in the arrangement illustrated in FIG. 1 is shown as a motor 32 supported by the frame 12.

The rotor 14 supports a plurality of log engaging tools 34 spaced circumferencially around the rotor and extending generally inwardly toward the axis of rotation of the rotor. As illustrated in FIG. 3, each log engaging tool 34 is supported by a pivot shaft 36 in turn supported by the rotor 14. The tools 34 are independently pivotable about the respective pivot shafts 36 between a position wherein the radially inward ends 38 of the tools 34 are closely adjacent the axis of rotation of the rotor 14 and a second position wherein the inwardly extending ends 38 of the tools are retracted or dilated to thereby permit the log to pass through the central opening 30 of the rotor.

Means are also provided for independently resiliently biasing the log engaging tools 34 toward a position wherein the log engaging ends of the tools 34 will be closely adjacent the axis of rotation of the rotor whereby the bark stripping ends 38 of the tools will engage the log with sufficient force that the tools 34 will remove bark from the logs as the rotor 14 rotates about its central longitudinal axis. In the illustrated construction, the means for causing the tools to be biased toward the closed position includes a plurality of rotary actuators 40, respective ones of the rotary actuators being independently operative to cause selective rotation of the respective tools 34. In other words, in the illustrated construction, there are five identical rotary actuators 40, and each is operative to rotate one of the tools 34. Referring more particularly to a single one of the rotary actuators 40, as illustrated in FIG. 3, it is of conventional construction and includes a hydraulic cylinder 42 having opposite ends. The shaft 36 supporting the tool 34 supports a pinion 44 and the rotary actuator includes a reciprocably movable rack 46 complementary with the pinion 44 of the tool shaft 36 such that reciprocal movement of the actuator pistons 48 at opposite ends of the cylinder 42 will cause consequent pivotal movement of the tool shaft 36 and movement of the tool 34 between the closed position and the open position.

Means are also provided for supplying controlled hydraulic fluid pressure to the opposite ends 66 and 68 of the cylinders 42 of the rotary actuators 40 to thereby control the pretensioning force applied on the tools 34. In the illustrated construction, there are five such means, one for each of the rotary actuators 40, and they are substantially identical. Therefore, only one of the means is illustrated. As illustrated in FIG. 4, each of the means for supplying hydraulic fluid pressure to the cylinder 42 includes a pair of hydraulic accumulators 52 and 54, one of the hydraulic accumulators comprising a low pressure accumulator 52 and being operably connected to one end 68 of the rotary actuator 40 and the oher of the hydraulic accumulators 54 being a high pressure accumulator and being operably connected to the opposite end 66 of the rotary actuator 40. The hydraulic accumulators 52 and 54 are conventional and will not be described in detail. Each hydraulic rotary actuator 40 supported by the rotor is operably connected to a separate and independent pair of hydraulic accumulators 52 and 54 such that each tool 34 is independently movable, and the petensioning force applied to one of the tools 34 is independent of the pretensioning force applied to an adjacent tool 34.

The hydraulic accumulators 52 and 54 each comprise a pressure vessel 56 having a cavity bisected by a movable wall 58 and including a precharged pneumatic chamber 60 and a second chamber 62 housing hydraulic fluid and communicating with the hydraulic cylinder of the rotary actuator 40. The hydraulic accumulators 52 and 54 are precharged such that the pistons 48 of the rotary actuator 40 will be biased toward a position wherein the respective tools 34 will be in their closed position wherein the log engaging ends 38 of the tools 34 are closely adjacent the axis of rotation of the rotor 14.

The high pressure accumulator 54 will function to maintain tension on the tool 34 while the low pressure accumulator 52 will resist such tension. The low pressure accumulator is used in the circuit to permit the flow of oil in and out of the low pressure side 68 of the actuator 40. As the tool opens, oil will be introduced into the low pressure side of the actuator both by the drawing action of the increasing volume and the positive action of the expansion of the compressed gas in the accumulator 52. This is essentially a free, or unobstructed, flow from the accumulator 52 to the actuator 40.

In operation of the log debarking machine 10, as the leading end of a log is forced into the central opening 30 of the rotor 14 by the roller assembly 16, the tools 34 will be engaged by the end of the log and will be forced to dilate or open to thereby permit passage of the log through the rotor 14. As the tools 34 open or move to a dilated position, the individual tools 34 pivot about their respective pivot shafts 36 supporting those tools, and the pistons 48 of the rotary actuators force hydraulic fluid from one end 66 of the cylinder 42 into the high pressure hydraulic accumulators 54 thereby further compressing the gas in the chambers 60 of those accumulators. At the same time, hydraulic fluid flows from the other or low pressure accumulator 52 into the opposite end 68 of the cylinder 42.

When the log passes through the rotor 14, the high pressure hydraulic accumulator 54 will force hydraulic fluid into the end 66 of the cylinder 42 of the rotary actuator to thereby force the tool 34 back to its radially inward or closed position.

Means are also provided for restricting the rate of fluid flow from the end 68 of the cylinder 42 to the accumulator 52 to thereby control the speed of movement of the tool 34 from its dilated position to the closed position, while also permitting substantially unrestricted flow of hydraulic fluid from the hydraulic accumulator 52 to the end 68 of the cylinder to thereby permit relatively unrestricted outward movement of the associated tool 34 from its closed position to the dilated position. In the illustrated construction, the means for restricting the rate of fluid flow includes a fluid restriction orifice 70 and a check valve 72 provided in parallel in the hydraulic circuit between the end 68 of the cylinder 42 of the rotary actuator and the low pressure accumulator 52.

It will be readily understood by those skilled in the art that the size of the hydraulic accumulators 52 and 54 employed can vary as can the gas precharge and hydraulic fluid charge pressures, depending upon such things as the required tool pretension force, the allowable tool force intensification and the desired rotary actuator displacement.

Purely for illustrative purposes and for purposes of example, in one form of the invention the rotary actuators 40 can have a displacement of approximately 22 cubic inches for 60 degrees of rotation, wherein the 60 degrees of rotation represents the maximum rotation of the debarking tool. Such actuators can also be selected such that they will generate approximately 10,600 inch-lbs. of torque at 500 psi.

Also for purposes of example, an arbitrary selected value of 100 psi can be selected as a preferred back pressure in the chamber 68 of the low pressure actuator 52 with the tool in the closed position. If it is determined, for purposes of example, that 10,000 inch—pounds of torque are required on the tool 34, to efficiently remove bark from a log, it will be necessary to have a 500 psi differential pressure across the actuator 40. Accordingly, the high pressure actuator must be precharged to 600 psi. The at rest pressures in the high and low pressure sides of the actuator 40, 66 and 68 respectively, are thus established. Subsequently, the gas precharge pressures in the two accumulators 52 and 54 are selected. One simple method of selecting the gas precharge pressures is to select a gas precharge pressure equal to 90% of the minimum allowable pressure in each of the accumulator lines. Using the example above, these values would be 540 psi in the high pressure accumulator 54 and 25 psi in the low pressure accumulator 52.

The first operation in setting the tool pretension is to vent both ends 66 and 68 of the actuator 40 to a hydraulic fluid reservoir with the tool 34 in the closed position. This can be accomplished typically with quick disconnect couplings and appropriate conventional valving. The high pressure side 66 of the hydraulic actuator should be connected, through conventional proper valving, to an auxiliary power unit and oil is introduced into the high pressure side 66 of the rotary actuator 40 until the pressure has reached a value of 600 psi. At this point, the power unit is disconnected from the high pressure side 66 of the rotary actuator 40 and appropriately connected to the low pressure side of the rotary actuator wherein oil can be metered to the low pressure side until the pressure of 100 psi is achieved. Upon disconnecting the power unit, the system is ready for operation. Due to the pressures applied in the rotary actuator 40, the tools are held in their closed position. Although the pneumatic chambers 60 of the accumulators were precharged to 540 and 25 psi, the gas pressures in the chambers 60 will then assume the values of the oil pressures in the individual circuits as dictated by the oil pressure in the rotary actuators 40.

During operation of the rotary debarking machine, as a tool 34 encounters the leading end of a log, as the log enters the central opening 30 of the rotor 14, whereby the tool 34 starts to open, the rotary actuator 40 connected to that tool 34 will draw oil into its low pressure side 68 from the low pressure accumulator 52 while at the same time, oil will be forced out of the high pressure side 66 of the rotary actuator into the high pressure accumulator 54. The gas in the pneumatic chamber 60 of low pressure accumulator 52 will expand, and, in so doing, reduce its pressure and also the back pressure on the actuator 40. Simultaneously, oil is forced into the high pressure accumulator 54 by movement of the tool, the increased hydraulic fluid volume in the high pressure accumulator 54 will increase the pressure in the pneumatic chamber 60 of that vessel. The magnitude of this pressure increase can be a function of the size of the accumulator selected. Proper selection of accumulators and rotary actuators will permit control of the tool pretension and also the allowable tool tension increase.

While in the arrangement described above, each of the rotary actuators 40 is independently plumbed such that the tools 34 are independently movable and operate independently of one another, in another embodiment of the invention, manifolds could be installed in one or more of the precharging circuits such that all of the rotary actuators and hydraulic accumulators could be charged simultaneously. Following the charging operation, the manifolds would be isolated from each rotary actuator and from the accumulators such that the tools would function independently with respect to one another.

Various features of the invention are set forth in the following claims.

We claim

1. Apparatus for removing bark from a log, the apparatus comprising: a frame, a rotor having a longitudinal axis and being supported by said frame for rotation about said longitudinal axis of said rotor, said rotor including a central opening, means for causing rotation of said rotor about said longitudinal axis, means for feeding logs through said central opening of said rotor in the direction of said longitudinal axis, a plurality of debarking tools supported by said rotor for rotation about said longitudinal axis, said debarking tools being spaced apart circumferentially around said longitudinal axis of said rotor, a first one of said debarking tools being supported for pivotal movement with respect to said rotor about a first pivot axis and between an open position and a closed position, means for biasing said first one of said debarking tools toward said closed position, said means for biasing including a first hydraulic fluid motor, a first source of hydraulic fluid pressure operably connected to said first hydraulic fluid motor, and a second source of hydraulic fluid pressure operably connected to said first hydraulic fluid motor, a second one of said debarking tools being supported for pivotal movement with respect to said rotor about a second axis spaced from said pivot axis of said first debarking tool, said second one of said debarking tools being supported for pivotal movement between an open position and a closed position, and means for biasing said second one of said debarking tools toward said closed position, said means for biasing said second one of said tools including a second hydraulic fluid motor operably connected to said second one of said debarking tools, a third source of hydraulic fluid pressure operably connected to said second hydraulic fluid motor, and a fourth source of hydraulic fluid pressure operably connected to said second hydraulic fluid motor.

2. Apparatus as set forth in claim 1 wherein said first hydraulic fluid motor is a rotary actuator including a first hydraulic fluid port and a second hydraulic fluid port, wherein said first source of hydraulic fluid pressure is a first hydraulic accumulator operably connected to said first hydraulic fluid port to supply hydraulic fluid pressure to said first hydraulic fluid port, and wherein said second source of hydraulic fluid pressure is a second hydraulic accumulator operably connected to said second hydraulic fluid port to supply hydraulic fluid pressure to said second hydraulic fluid port.

3. Apparatus as set forth in claim 2 wherein said second hydraulic fluid motor is a second rotary actuator including a third hydraulic fluid port and a fourth hydraulic fluid port, wherein said third source of hydraulic fluid pressure is a third hydraulic accumulator operably connected to said third hydraulic fluid port to supply hydraulic fluid pressure to said third hydraulic fluid port, and wherein said fourth source of hydraulic fluid pressure is a fourth hydraulic accumulator operably connected to said fourth hydraulic fluid port to supply hydraulic fluid pressure to said fourth hydraulic fluid port.

4. Apparatus as set forth in claim 1 wherein said first hydraulic fluid motor includes a first rotary actuator connected to said first debarking tool for causing pivotal movement of said first debarking tool, said first rotary actuator including a high pressure fluid port and a low pressure fluid port, a first source of hydraulic fluid pressure connected to said high pressure port and a second source of hydraulic fluid pressure being connected to said low pressure fluid port.

5. Apparatus as set forth in claim 4 wherein said first source of hydraulic fluid pressure includes a first hydraulic pressure accumulator containing hydraulic fluid having a first hydraulic fluid pressure and wherein said second source of hydraulic fluid pressure includes a second hydraulic pressure accumulator containing hydraulic fluid having a second hydraulic fluid pressure, said first hydraulic fluid pressure being greater than said second hydraulic fluid pressure.

6. Apparatus as set forth in claim 5 and further including means for restricting the flow of hydraulic fluid from said first rotary actuator to said second hydraulic pressure accumulator, said means for restricting flow providing unrestricted flow of hydraulic fluid from said second hydraulic pressure accumulator to said first rotary actuator.

7. Apparatus as set forth in claim 1 and wherein said first one of said debarking tools is movable independently of said second one of said debarking tools.

8. Apparatus as set forth in claim 1 and further including means for controlling the speed of movement of said first debarking tool from said open position to said closed position, said means for controlling the speed of movement including means for controlling the flow of hydraulic fluid from said first hydraulic motor to said first source of hydraulic fluid pressure.

9. Apparatus for removing bark from a log, the apparatus comprising: a frame, a rotor having a central longitudinal axis and supported by said frame for rotation about said longitudinal axis of said rotor, said rotor including a central opening, means for causing rotation of said rotor about said longitudinal axis, means for feeding logs through said central opening of said rotor in the direction of said longitudinal axis, a plurality of debarking tools supported by said rotor for rotation about said longitudinal axis, said debarking tools being spaced apart circumferentially around said longitudinal axis of said rotor, a first one of said debarking tools being supported for pivotal movement with respect to said rotor about a first pivot axis and between an open position and a closed position, means for biasing said first one of said debarking tools toward said closed position, said means for biasing including a first hydraulic fluid motor, and a first closed hydraulic circuit supplying hydraulic fluid pressure to said first hydraulic fluid motor, a second one of said debarking tools being supported for pivotal movement with respect to said rotor about a second axis spaced from said pivot axis of said first debarking tool, said second one of said debarking tools being supported for pivotal movement between an open position and a closed position, and means for biasing said second one of said debarking tools toward said closed position, said means for biasing said second one of said debarking tools including a second hydraulic fluid motor operably connected to said second one of said debarking tools and a second closed hydraulic circuit supplying hydraulic fluid pressure to said second hydraulic fluid motor, said second closed hydraulic circuit being isolated from said first closed hydraulic circuit.

10. Apparatus as set forth in claim 9 wherein said first hydraulic fluid motor is a rotary actuator including a first hydraulic fluid port and a second hydraulic fluid port, wherein said first closed hydraulic circuit includes a first hydraulic accumulator operably connected to said first hydraulic fluid port to supply hydraulic fluid pressure to said first hydraulic fluid port, and a second hydraulic accumulator operably connected to said second hydraulic fluid port to supply hydraulic fluid pressure to said second hydraulic fluid port.

11. Apparatus as set forth in claim 10 wherein said second hydraulic fluid motor is a second rotary actuator including a third hydraulic fluid port and a fourth hydraulic fluid port, wherein said second closed hydraulic circuit includes a third hydraulic accumulator operably connected to said third hydraulic fluid port to supply hydraulic fluid pressure to said third hydraulic fluid port, and a fourth hydraulic accumulator operably connected to said fourth hydraulic fluid port to supply hydraulic fluid pressure to said fourth hydraulic fluid port.

12. Apparatus as set forth in claim 9 wherein said first hydraulic fluid motor includes a first rotary actuator connected to said first debarking tool for causing pivotal movement of said first debarking too, said first rotary actuator including a high pressure fluid port and a low pressure fluid port, and wherein said first closed hydraulic circuit includes a first source of hydraulic fluid pressure connected to said high pressure port and a second source of hydraulic fluid pressure being connected to said low pressure fluid port.

13. Apparatus as set forth in claim 12 wherein said first source of hydraulic fluid pressure includes a first hydraulic pressure accumulator containing hydraulic fluid having a first hydraulic fluid pressure and wherein said second source of hydraulic fluid pressure includes a second hydraulic pressure accumulator containing hydraulic fluid having a second hydraulic fluid pressure, said first hydraulic fluid pressure being greater than said second hydraulic fluid pressure.

14. Apparatus as set forth in claim 13 and further including means for restricting the flow of hydraulic fluid from said first rotary actuator to said second hydraulic pressure accumulator, said means for restricting flow providing unrestricted flow of hydraulic fluid from said second hydraulic pressure accumulator to said first rotary actuator.

15. Apparatus as set forth in claim 9 and wherein said first one of said debarking tools is movable independently of said second one of said debarking tools.

16. Apparatus for use in a debarking machine having a frame, a rotor having a longitudinal axis and being supported by said frame for rotation about said longitudinal axis of and the rotor, said rotor including a central opening, means for causing rotation of said rotor about said longitudinal axis, means for feeding logs through said central opening of said rotor in the direction of said longitudinal axis, a plurality of debarking tools supported by said rotor for rotation about said longitudinal axis, said debarking tools beings spaced apart circumferentially around said longitudinal axis of said rotor, a first one of said debarking tools being supported for pivotal movement with respect to said rotor about a first pivot axis and between an open position and a closed position wherein said first one of said debarking tools engages a log in said central opening, and a second one of said debarking tools being supported for pivotal movement with respect to said rotor about a second axis spaced from said pivot axis of said first debarking tool, said second one of said debarking tools being supported for pivotal movement between an open position and a closed position, said apparatus comprising means for biasing said first one of said debarking tools toward said closed position, said means for biasing including a first hydraulic fluid motor, a first source of hydraulic fluid pressure operably connected to said first hydraulic fluid motor, and a second source of hydraulic fluid pressure operably connected to said first hydraulic fluid motor, and means for biasing said second one of said debarking tools toward said closed position, said means for biasing said second one of said tools including a second hydraulic fluid motor operably connected to said second one of said debarking tools, a third source of hydraulic fluid pressure operably connected to said second hydraulic fluid motor, and a fourth source of hydraulic fluid pressure operably connected to said second hydraulic fluid motor.

17. Apparatus as set forth in claim 16 wherein said first hydraulic fluid motor is a rotary actuator including a first hydraulic fluid port and a second hydraulic fluid port, wherein said first source of hydraulic fluid pressure is a first hydraulic accumulator operably connected to said first hydraulic fluid port to supply hydraulic fluid pressure to said first hydraulic fluid port, and wherein said second source of hydraulic fluid pressure is a second hydraulic accumulator operably connected to said second hydraulic fluid port to supply hydraulic fluid pressure to said second hydraulic fluid port.

18. Apparatus as set forth in claim 17 wherein said second hydraulic fluid motor is a second rotary actuator including a third hydraulic fluid port, and a fourth hydraulic fluid port, wherein said third source of hydraulic fluid pressure is a third hydraulic accumulator operably connected to said third hydraulic fluid port to supply hydraulic fluid pressure to said third hydraulic fluid port, and wherein said fourth source of hydraulic fluid pressure is a fourth hydraulic accumulator operably connected to said fourth hydraulic fluid port to supply hydraulic fluid pressure to said fourth hydraulic fluid port.

19. Apparatus as set forth in claim 16 wherein said first hydraulic fluid motor includes a first rotary actuator connected to said first debarking tool for causing pivotal movement of said first debarking tool, said first rotary actuator including a high pressure fluid port and a low pressure fluid port, a first source of hydraulic fluid pressure connected to said high pressure port and a second source of hydraulic fluid pressure being connected to said low pressure fluid port.

20. Apparatus as set forth in claim 19 wherein said first source of hydraulic fluid pressure includes a first hydraulic pressure accumulator containing hydraulic fluid having a first hydraulic fluid pressure and wherein said second source of hydraulic fluid pressure includes a second hydraulic pressure accumulator containing hydraulic fluid having a second hydraulic fluid pressure, said first hydraulic fluid pressure being greater than said second hydraulic fluid pressure.

21. Apparatus as set forth in claim 20 and further including means for restricting the flow of hydraulic fluid from said first rotary actuator to said second hydraulic pressure accumulator, said means for restricting flow providing unrestricted flow of hydraulic fluid from said second hydraulic pressure accumulator to said first rotary actuator.

* * * * *